United States Patent Office 3,239,487
Patented Mar. 8, 1966

3,239,487
METHOD OF PREPARING FOAMABLE NOVOLAKS
Rinse Dijkstra, Eindhoven, Netherlands, assignor to North American Philips Company, Inc., New York, N.Y., a corporation of Delaware
No Drawing. Filed July 24, 1961, Ser. No. 125,980
Claims priority, application Netherlands, Aug. 3, 1960, 254,508
4 Claims. (Cl. 260—54)

This invention relates to the preparation of a novolak which, on heating together with hexamethylenetetramine forms a hardened foam mass.

By a novolak is understood in this connection noncurable condensate resin of a hydroxybenzene and formaldehyde.

It is known that novolaks, obtained by causing a hydroxybenzene to react with an aldehyde in an acid medium in a molecular ratio which is larger than 11/9, often form a foam upon adding hexamethylene tetramine while hardening.

The behaviour of such a mixture on hardening, however, often cannot be foretold with full certainty and often is not reproducible. Thus, when hardening a novolak-hexamethylene tetramine mixture, a rubber-like stage occurs for some time. If this rubber-like stage lasts too long, much gas can escape from the foaming mass before the mass is hardened. As a result of this, sometimes no foam at all or hardly any foam is formed.

If a hardened foam is formed, the cellular volume often varies between very wide limits.

A principal object of the invention is to prepare a novolak which does not have this and other drawbacks.

According to the invention, a novolak which, on hardening with hexamethylene tetramine, yields a foam which meets high requirements, is obtained by preparing, in a basic medium, a condensate of a trifunctional hydroxybenzene and an excess of formaldehyde and then causing the reaction mixture to react in an acid medium with a bifunctional hydroxybenzene until a novolak is obtained.

By a trifunctional hydroxybenzene is understood in this connection a hydroxybenzene which, in reaction with an aldehyde, is trifunctional and which can consequently bind at most three molecules of aldehyde per molecule, for example: phenol, m-cresol, 3,5-xylenol and resorcinol.

By a bifunctional hydroxybenzene is understood a hydroxybenzene which, in reaction with formaldehyde is bifunctional and which can consequently bind at most two molecules of formaldehyde per molecule, for example o-cresol, p-cresol, 2,3-xylenol, 2,5-xylenol and t-butyl-phenol.

The preparation of the new novolaks is carried out as follows:

A trifunctional hydroxybenzene and formaldehyde, in a molecular ratio of at least 1:3 is caused to react, in basic medium, for a period such that 2.0 to 2.5 gram molecules of formaldehyde are bound per gram molecule of the hydroxybenzene. The resultant concentration of trimethylol derivatives in the condensate in the first instance is decisive in the formation of a hardened foam of a good rigidity and a uniform distribution of the cellular volume. The quantity of the bound formaldehyde is a measure of the trimethylol content. For the determination of this content see: De Jong, J.I., Rec. trav. chim., 72,356 (1953).

The formaldehyde may be used as such in an aqueous solution. Alternatively, paraform-water or paraform-formaldehyde-water-mixtures may be used.

The temperature of the mixture during the reaction in the alkaline medium may vary between 0 and 70° C. This reaction is preferably carried out between 30 and 65° C., it having appeared that in this temperature range a sufficient formation of trimethylolphenols at a minimum quantity of basically reacting substance is obtained in the mixture after a short period.

As a basically reacting substance is preferably used a strong base which yields readily soluble phenolates, for example the hydroxides of the alkali and alkaline earth metals such as $Ca(OH)_2$, $Ba(OH)_2$ NaOH and KOH. Most favorable quantities of these bases lie between 0.06 gram equivalents at 65° C. and 1 gram equivalent at 0° C. per gram molecule of hydroxybenzene. When the desired quantity of formaldehyde is converted, a bifunctional hydroxybenzene is added in a quantity such that the molecular ratio of tri- and bi-molecular hydroxybenzene to formaldehyde in a free and bound condition preferably is at least 10/9 and at most 11/9, for at a larger ratio often no satisfactory foams are obtained any longer, while a smaller ratio usually is associated with an increase of the melting point of the novolak which may produce foams having a specific weight which is too high for practical purposes.

This mixture is then neutralized and acidified. Preferably the basically reacting substance is neutralized with an acid reacting substance which forms an insoluble salt with the base. Suitable combinations in this connection are for example: $Ca(OH)_2$ and $H_2SO_4$, $Ba(OH)_2$ and $H_2SO_4$. Then the mixture is condensed at an elevated temperature. Then water is removed from the resulting resin-water mixture. When cooling the reaction mixture, a hard brittle substance is formed having novolak properties which can easily be pulverized and mixed with hexamethylene-tetramine or other desired substances. It is also possible to mix the novolak in a molten condition with other substances. The melting range usually lies between approximately 60 and 90° C.

In order that the invention may be readily carried into effect, it will now be described in greater detail with reference to the following examples.

*Example 1*

A mixture of 300 g. of 94% aqueous phenol solution (=3 gram molecules of phenol),
702 g. of approximately 38% of formalin (=9 gram molecules of formaldehyde) and
38.9 g. of calcium hydroxide (=0.5 gram molecule of $Ca(OH)_2$) is heated on a water bath for 20 hours at 40° C., while stirring, in a flask provided with a reflux condenser. Then, approximately 78% of the quantity of formaldehyde present is bound. This corresponds to 2.34 gram molecules of formaldehyde per gram-molecule of phenol.

Then 812 g. (=7.5 gram molecules) of o-cresol are added to the reaction mixture. The ratio phenol+o-cresol to formaldehyde in a free and bound condition in the reaction mixture in gram-molecules is 10.5/9.

After the addition of the o-cresol, the reaction mixture is neutralized with 8 N sulphuric acid and the calcium sulphate formed is distilled off.

The filtrate is heated to boiling, after which gradually 21 cc. of 4 N hydrochloric acid are added to the reaction mixture. After all the hydrochloric acid has been added, heating is continued for another 80 minutes.

Then the reaction mixture is freed from water by distillation. Distillation is continued until the temperature has reached approximately 120° C. Then the hydrochloric acid still available is neutralized with magnesium oxide and distillation is continued at reduced pressure until the temperature has reached approximately 145° C. at 100 mm. The resin at room temperature is hard and brittle, its melting point is approximately 64° C.

*Example II*

The mixture of phenol, formaldehyde and Ca(OH)$_2$ according to Example I is heated at 40° C. for 23 hours. Then approximately 80% of formaldehyde is bound which corresponds to 2.4 gram molecules of formaldehyde per gram molecule of phenol.

Then 865 g. of p-cresol (=8 gram molecules) are added to the reaction mixture. The ratio phenol+p-cresol to formaldehyde in a free and bound condition in gram molecules thus becomes 11/9.

The reaction mixture is further treated as described in Example I.

The resulting resin after cooling is hard and brittle and has a melting range of from 62–68° C.

*Example III*

A mixture of 317 g. of phenol solution (commercial purity), containing 3 gram molecules of phenol, 720 g. of approximately 37% formalin containing 9 gram molecules of formaldehyde and 14 g. of Ca(OH)$_2$ (0.18 gram molecule of Ca(OH)$_2$) is heated at 50° C. for 17 hours in a flask provided with a reflux condenser. Then approximately 75% of formaldehyde is bound. This corresponds to 2.25 gram molecules of formaldehyde per gram molecule of phenol.

Subsequently, 758 g. (17 gram-molecules) of o-cresol are added to the reaction mixture. As a result of this, the ratio phenol+o-cresol to formaldehyde in a free and bound condition in the reaction mixture is brought to 10/9. The reaction mixture is further treated as described in Example I. The resulting resin is hard and brittle and has a melting range of from 77–83° C.

*Example IV*

A mixture of 211.2 g. of phenol solution (commercial purity) (2 gram-molecules of phenol), 483.0 g. of approximately 37% formalin (6 gram-molecules of formaldehyde), 4.67 g. of Ca(OH)$_2$ (containing 0.06 gram-molecule of Ca(OH)$_2$) is heated at 65° C. for 8 hours in a flask provided with a reflux condenser. Then approximately 73% of formaldehyde is bound. This corresponds to 2.19 gram molecules of formaldehyde per gram molecule of phenol. Subsequently 504 g. of o-cresol (=4⅔ gram-molecules) are added to the mixture. As a result of this, the ratio phenol+o-cresol to formaldehyde in gram-molecules in the reaction mixture becomes 10/9. The reaction mixture is further treated as in Example I.

The resulting resin is hard and brittle and has a melting range of from 71° to 78° C.

Hardened foam masses can be obtained by means of the new novolaks in the following manner.

10 parts by weight of the pulverized novolak is mixed with 0.7–14 parts of finely pulverized hexamethylenetetramine. This mixture is then heated between 140° C. and 180° C. for a short period of time usually about 15 minutes being sufficient. Then a hard non-flexible foam mass is formed. The specific weight usually lies between 0.05 and 0.1.

If desired, filling agents, dyes, surface active substances, gas forming substances and the like may be added to the foam-forming mixture.

The foam forming mixture may be caused to foam on the spot, for example in bulbs of incandescent lamps, or may be provided as plates or in a different form. The foams may be used as electrically insulating, heat insulating or acoustically insulating material and for other purposes.

*Example V*

10 parts by weight of novolak obtained according to Example III are mixed with 0.84 part by weight of hexamethylenetetramine and then heated at 100° C. for 30 minutes while being homogenized and then hardened at 160° C. for 15 minutes.

The resultant hard foam has small bubbles of uniform size. The specific weight is approximately 0.1.

*Example VI*

10 parts by weight of novolak prepared according to Example I are mixed with 0.84 part by weight of hexamethylene tetramine and 0.15 part by weight of ammonium carbonate. The mixture is hardened at 160° C. for 15 minutes. The resultant hardened foam has a specific weight of 0.055.

While I have described my invention in connection with specific embodiments and applications, other modifications thereof will be readily apparent to those skilled in this art without departing from the spirit and scope of the invention as defined in the appended claims.

What I claim is:

1. A method of producing a novolak, capable when mixed with hexamethylenetetramine and subjected to heat of forming a hardened foamed mass having cells of substantially uniform size, which method comprises heating at least 3 gram molecules of formaldehyde with a gram molecule of a trifunctional hydroxybenzene selected from the group consisting of phenol, m-cresol, 3,5-xylenol and resorcinol in an alkaline medium for such a time that from about 2.00 to 2.50 gram molecules of the formaldehyde are bound to the hydroxybenzene and then the steps consisting of neutralizing and acidifying the resultant reaction mixture, adding a bifunctional monomeric hydroxy benzene compound selected from the group consisting of o-cresol, p-cresol, 2,3-xylenol, 2,5-xylenol and t-butyl phenol, said bifunctional monomeric hydroxy benzene being added in such a quantity that the molecular ratio of the sum of the total amount of the trifunctional hydroxy benzene compound and the bifunctional hydroxy benzene compound to the formaldehyde is from 10:9 to 11:9 and continuing to heat the mixture until the novolak is formed.

2. The method of claim 1 wherein the alkaline content of the alkaline medium ranges from 1 gram equivalent at 0° C. to 0.06 gram equivalents at 65° C. per gram-molecule of the trifunctional hydroxybenzene.

3. The method of claim 1 wherein the heating is carried out at a temperature of between about 0° C. to 70° C.

4. The method of claim 1 wherein the heating is carried out at a temperature of between about 30° C. to 65° C.

References Cited by the Examiner

UNITED STATES PATENTS

| | | | |
|---|---|---|---|
| 1,944,016 | 1/1934 | Seebach | 260—57 |
| 2,168,981 | 8/1939 | Flood et al. | 260—60 |
| 2,417,959 | 3/1947 | Webber et al. | 260—57 |
| 2,513,274 | 7/1950 | Barkhuff | 260—58 |

OTHER REFERENCES

Baekeland, Journal of Industrial and Engineering Chemistry, vol. 4, No. 10, October 1912, pages 737–743.

WILLIAM H. SHORT, *Primary Examiner.*

HAROLD N. BURSTEIN, *Examiner.*